United States Patent
Yaegashi et al.

(10) Patent No.: US 7,906,216 B2
(45) Date of Patent: Mar. 15, 2011

(54) POLARIZING PLATE, MANUFACTURING METHOD THEREFOR, OPTICAL FILM AND IMAGE DISPLAY

(75) Inventors: Masahiro Yaegashi, Osaka (JP); Tetsurou Ikeda, Osaka (JP); Yuuki Nakano, Osaka (JP); Reiko Akari, Osaka (JP); Mitsuru Suzuki, Osaka (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 272 days.

(21) Appl. No.: 12/238,614

(22) Filed: Sep. 26, 2008

(65) Prior Publication Data
US 2009/0086318 A1 Apr. 2, 2009

(30) Foreign Application Priority Data

Sep. 28, 2007 (JP) ................................. 2007-254716
Jul. 2, 2008 (JP) ................................. 2008-173712

(51) Int. Cl.
*B32B 9/04* (2006.01)
*B32B 27/00* (2006.01)
*B32B 27/36* (2006.01)
*B32B 13/12* (2006.01)
*B32B 27/08* (2006.01)

(52) U.S. Cl. ...................... 428/448; 428/411.1; 428/412; 428/451; 428/474.4; 428/476.3; 428/500; 427/372.2

(58) Field of Classification Search ........................ None
See application file for complete search history.

(56) References Cited

FOREIGN PATENT DOCUMENTS

| JP | 61246719 A | 11/1986 |
|---|---|---|
| JP | 2001296427 A | 10/2001 |
| JP | 2006220732 A | 8/2006 |

*Primary Examiner* — Sheeba Ahmed
(74) *Attorney, Agent, or Firm* — Westerman, Hattori, Daniels & Adrian, LLP

(57) ABSTRACT

A polarizing plate of the present invention comprises: a polarizer; a transparent protective film placed on at least one side of the polarizer; and an adhesive layer and an adhesion facilitating layer interposed in this order from the polarizer side between the polarizer and the transparent protective film, wherein the adhesive layer is formed with an active energy ray-curable adhesive that contains a hydroxyl group-containing N-substituted amide monomer as a curable component, and the adhesion facilitating layer is formed with a polymer resin composition that contains 100 parts by weight of a polymer resin and 3 to 30 parts by weight of an organosilane compound having at least one functional group selected from an acryloyl group, a methacryloyl group, a vinyl group, and a mercapto group. The polarizing plate has good adhesion.

9 Claims, No Drawings

POLARIZING PLATE, MANUFACTURING METHOD THEREFOR, OPTICAL FILM AND IMAGE DISPLAY

BACKGROUND OF THE INVENTION

1. Field of the Invention

The present invention relates to a polarizing plate and a manufacturing method thereof. The polarizing plate may be used alone or as a part of a laminated optical film to form liquid crystal displays (LCDs), organic EL displays, CRTs, PDPs, and so on.

2. Description of the Related Art

The liquid crystal display market has rapidly expanded in such fields as clocks, mobile phones, PDAs, note PCs, PC monitors, DVD players, and TVs. Liquid crystal displays use liquid crystal switching to visualize changes in polarization state, and based on the display principle, they use polarizers. Particularly in TV applications and the like, there is an increasing demand for higher brightness, higher contrast, and wider viewing angle. Thus, higher transmittance, higher degree of polarization and higher color reproducibility are also demanded of polarizing plates.

Iodine containing polarizer made of stretched polyvinyl alcohol in which iodine is adsorbed has high transmittance and high degree of polarization and are most popular polarizers widely used. A general polarizing plate is manufactured by bonding a transparent protective film to both sides of a polarizer with a so-called aqueous adhesive, which is a solution of a polyvinyl alcohol material in water (see JP-A Nos. 2006-220732 and 2001-296427). Triacetylcellulose or the like having high moisture permeability is used for the transparent protective film.

When an aqueous adhesive such as a polyvinyl alcohol adhesive is used in the process of manufacturing the polarizing plate as described above, however, a drying process is necessary after the polarizer and the transparent protective film are laminated. The presence of such a drying process in manufacture of the polarizing plate is unfavorable in view of an improvement in the productivity of the polarizing plate.

Also when an aqueous adhesive is used (in the case of so-called wet lamination), the polarizer must have relatively high moisture content such that the adhesion to the adhesive can be increased (in general, the polarizer has a moisture content of about 30%). Otherwise, the aqueous adhesive cannot provide good adhesion in the resulting polarizing plate. However, the polarizing plate obtained as described above has a problem in which its dimensions can significantly change at high temperature or at high temperature and high humidity. On the other hand, in order to suppress such a dimensional change, the moisture content of the polarizer may be reduced, or a transparent protective film with low moisture permeability may be used. However, the lamination of such a polarizer and such a transparent protective film with an aqueous adhesive can lead to a reduction in the efficiency of the drying process, a degradation in the polarizing properties, or defects of appearance so that practically useful polarizing plates cannot be obtained.

In recent years, as the screen size of image displays (particularly typified by TVs) increases, upsizing of polarizing plates becomes very important in view of productivity and cost (an increase in yield and the number of available pieces). However, the polarizing plate using the aqueous adhesive has a problem in which a change in its size occurs by the heat from a backlight to cause unevenness so that the so-called light leakage (unevenness) can be significant in which a black viewing displayed on the whole of the screen partially looks whitish.

Under the above-described circumstances, there are many proposals for the use of active energy ray-curable (particularly ultraviolet-ray curing) adhesives in place of aqueous adhesives. For example, an ultraviolet-ray curable adhesive is proposed that includes an acrylic oligomer of epoxy acrylate, urethane acrylate, polyester acrylate, or the like, and an acrylic or methacrylic monomer as a diluent (see JP-A No. 61-246719).

In addition, performance required of polarizing plates becomes strict, and improved adhesive property between a polarizer and a transparent protective film has been demanded even using the active energy ray-curable adhesives.

SUMMARY OF THE INVENTION

An object of the present invention is to provide a polarizing plate including a polarizer and a transparent protective film bonded together with an active energy ray-curable adhesive and having good adhesion, and to provide a method for manufacturing such a polarizing plate.

It is another object of the present invention to provide an optical film in which a polarizing plate is laminated and to provide an image display, such as a liquid crystal display, using such a polarizing plate or such an optical film.

As a result of investigations for solving the problems, the inventors have found that the objects can be achieved with the polarizing plate described below, so that the present invention has been completed.

The present invention relates to a polarizing plate, comprising:

a polarizer;

a transparent protective film placed on at least one side of the polarizer; and an adhesive layer and an adhesion facilitating layer interposed in this order from the polarizer side between the polarizer and the transparent protective film, wherein the adhesive layer is formed with an active energy ray-curable adhesive that contains a hydroxyl group-containing N-substituted amide monomer as a curable component, and the adhesion facilitating layer is formed with a polymer resin composition that contains 100 parts by weight of a polymer resin and 3 to 30 parts by weight of an organosilane compound having at least one functional group selected from an acryloyl group, a methacryloyl group, a vinyl group, and a mercapto group.

In the polarizing plate, the polymer resin constituting the adhesion facilitating layer preferably has a polyester skeleton.

In the polarizing plate, the curable component may contain an N-substituted amide monomer represented by the general formula (1): $CH_2=C(R^1)-CONR^2(R^3)$, wherein $R^1$ represents a hydrogen atom or a methyl group, $R^2$ represents a hydrogen atom or a straight or branched chain alkyl group having 1 to 4 carbon atoms and optionally having a hydroxyl group, a mercapto group, an amino group, or a quaternary ammonium group, and $R^3$ represents a hydrogen atom or a straight or branched chain alkyl group having 1 to 4 carbon atoms, provided that $R^2$ and $R^3$ are not simultaneously a hydrogen atom, or $R^2$ and $R^3$ are bonded to form a five-membered or six-membered ring optionally having an oxygen atom.

In the polarizing plate, the active energy ray-curable adhesive is preferably an electron beam-curable adhesive.

In the polarizing plate, the transparent protective film made of at least one selected from a cellulose resin, a polycarbonate resin, a cyclic olefin polymer resin and a (meth)acrylic resin is preferably used.

The present invention also related to a method for manufacturing a polarizing plate comprising a polarizer and a transparent protective film placed on at least one side of the polarizer with an adhesive layer and an adhesion facilitating layer interposed therebetween in this order from the polarizer side, comprising the steps of:

providing a transparent protective film on which an adhesion facilitating layer is formed, wherein the adhesion facilitating layer comprises a polymer resin composition that contains 100 parts by weight of a polymer resin and 3 to 30 parts by weight of an organosilane compound having at least one functional group selected from an acryloyl group, a methacryloyl group, a vinyl group, and a mercapto group;

laminating a polarizer to the transparent protective film with an active energy ray-curable adhesive containing a hydroxyl group-containing N-substituted amide monomer as a curable component such that the adhesion facilitating layer formed on the transparent protective film faces the polarizer; and then curing the adhesive by irradiation with an active energy ray to form an adhesive layer.

The present invention also related to an optical film in which at least one layer of the above polarizing plate is laminated.

The present invention also related to an image display, comprising the above polarizing plate or the above optical film.

In the polarizing plate of the present invention, an active energy ray-curable adhesive is used for bonding the polarizer to the transparent protective film. Since the active energy ray-curable adhesive may be a solvent-free adhesive, the polarizer can be bonding to the transparent protective film without a drying process as used for aqueous adhesives. The active energy ray-curable adhesive allows high-speed production as compared with aqueous adhesives, because it forms an adhesive layer upon exposure to active energy rays.

The active energy ray-curable adhesive for use in the polarizing plate is preferably an electron beam-curable adhesive. Electron beam-curable adhesives can provide higher productivity than ultraviolet-ray curable adhesives. The use of an electron beam in the process of curing the adhesive used for bonding the polarizer to the transparent protective film (specifically dry lamination) can eliminate a heating process, which would otherwise be necessary for an ultraviolet-ray curing method, and thus can provide very high productivity. Electron beam-curable adhesives can further increase the durability of the polarizing plate as compared with ultraviolet-ray curable adhesives.

When an active energy ray-curable adhesive is used for bonding a polarizer to a transparent protective film as mentioned above, the adhesive strength between the polarizer and the transparent protective film could be insufficient in some cases. If the adhesive strength is insufficient, delamination between the polarizer and the protective film could occur in the process of reworking the polarizing plate, which is performed due to the improper setting position of the polarizing plate or the like. According to the present invention, an adhesion facilitating layer is provided between the transparent protective film and the adhesive layer formed with an active energy ray-curable adhesive containing a hydroxyl group-containing N-substituted amide monomer as a curable component, so that the adhesive strength is improved, which can suppress delamination during reworking. According to the present invention, since the adhesive layer is formed with the active energy ray-curable adhesive, the adhesion facilitating layer contains a specific organosilane compound in combination with a polymer resin serving as a base material in order to provide a higher level of adhesive strength to the adhesive layer. Specifically, the organosilane compound used according to the present invention has at least one functional group selected from an acryloyl group, a methacryloyl group, a vinyl group, and a mercapto group, so that the adhesion facilitating layer can further enhance the adhesive strength.

In the present invention, described above, the hydroxyl group-containing N-substituted amide monomer is used as a curable component of the active energy ray-curable adhesive. The monomer is preferred in terms of adhesion property and particularly suitable for electron beam-curable adhesives. Electron beam-curable adhesives can also exhibit good adhesion to both a low-moisture-content polarizer and a transparent protective film produced with a low-moisture-permeability material so that the resulting polarizing plate can have a high level of dimensional stability.

The use of the curable component described above allows the production of polarizing plates whose dimensions are less changeable and thus can facilitate upsizing of polarizing plates and keep the manufacturing cost low in terms of yield and the number of available pieces. The polarizing plate obtained in the present invention has a high level of dimensional stability and thus can reduce unevenness caused by external heat from a backlight in an image display.

DETAILED DESCRIPTION OF THE PREFERRED EMBODIMENTS

In the polarizing plate of the present invention, a transparent protective film is provided on at least one side of a polarizer with an adhesive layer interposed therebetween. The adhesive layer is formed with an active energy ray-curable adhesive. The active energy ray-curable adhesive contains a hydroxyl group-containing N-substituted amide monomer as a curable component. At least one hydroxyl group may be bonded as a substituent to the nitrogen atom (N) that forms the amide group, or two or more hydroxyl groups may be bonded as substituents to the nitrogen atom. The hydroxyl group-containing N-substituted amide monomer to be used may be monofunctional or bifunctional or polyfunctional. One or more hydroxyl group-containing N-substituted amide monomers may be selected and used alone or in combination.

The hydroxyl group-containing N-substituted amide monomer can produce good adhesion even to a low moisture content polarizer or a transparent protective film produced with a low water vapor permeability material. In particular, the monomers listed below can produce good adhesion. Examples of the hydroxyl group-containing N-substituted amide monomer include N-hydroxyethyl(meth)acrylamide, N-(2,2-dimethoxy-1-hydroxyethyl)-(meth)acrylamide, N-hydroxymethyl(meth)acrylamide, p-hydroxyphenyl (meth)acrylamide, and N,N'-(1,2-dihydroxyethylene)bis (meth)acrylamide. Above all, N-hydroxyethyl(meth)acrylamide is preferred. The term "(meth)acrylamide" means acrylamide group and/or methacrylamide group. In the present invention, "meth" has the same meaning as described above.

Besides the hydroxyl group-containing N-substituted amide monomer, other monomers may be added as a curable component. Examples of other monomers that may be used as curable components include (meth)acryloyl group-containing compounds and vinyl group-containing compounds. Such other monomers that may be used as curable components may be monofunctional or bifunctional or polyfunctional. One or more of these curable components may be selected and used alone or in combination.

An N-substituted amide monomer other than the hydroxyl group-containing N-substituted amide monomer is preferably suitable as the other monomers used as the curable components. The N-substituted amide monomer may be represented by the general formula (1): $CH_2=C(R^1)—CONR^2(R^3)$, wherein $R^1$ represents a hydrogen atom or a methyl group, $R^2$ represents a hydrogen atom or a straight or branched chain alkyl group having 1 to 4 carbon atoms and optionally having a hydroxyl group, a mercapto group, an amino group, or a quaternary ammonium group, and $R^3$ represents a hydrogen atom or a straight or branched chain alkyl group having 1 to 4 carbon atoms, provided that $R^2$ and $R^3$ are not simultaneously a hydrogen atom, or $R^2$ and $R^3$ are bonded to form a five-membered or six-membered ring optionally having an oxygen atom. Concerning $R^2$ or $R^3$ in the general formula (1), the straight or branched chain alkyl group of 1 to 4 carbon atoms may be methyl, ethyl, isopropyl, or tert-butyl; the hydroxyl group-containing alkyl group may be hydroxymethyl or hydroxyethyl; and the amino group-containing alkyl group may be aminomethyl or aminoethyl. Alternatively, $R^2$ and $R^3$ may be bonded to form an optionally oxygen atom-containing five- or six-membered ring, which may include a nitrogen-containing heterocyclic ring. Examples of the heterocyclic ring include a morpholine ring, a piperidine ring, a pyrrolidine ring, and a piperazine ring.

Examples of the N-substituted amine monomer include N-methyl(meth)acrylamide, N,N-dimethyl(meth)acrylamide, N,N-diethyl(meth)acrylamide, N-isopropylacrylamide, N-butyl(meth)acrylamide, N-hexyl(meth)acrylamide, N-methylol(meth)acrylamide, N-methylol-N-propane(meth)acrylamide, aminomethyl(meth)acrylamide, aminoethyl(meth)acrylamide, mercaptomethyl(meth)acrylamide, and mercaptoethyl(meth)acrylamide. Examples of the heterocyclic ring-containing monomer include N-acryloylmorpholine, N-acryloylpiperidine, N-methacryloylpiperidine, and N-acryloylpyrrolidine. One, or two or more of these N-substituted amide monomers may be used singly or in combination.

When the hydroxyl group-containing N-substituted amide monomer and the above N-substituted amide monomer represented by formula (1) is used in combination as curable components, a combination of N-hydroxyethyl(meth)acrylamide with N-acryloylmorpholine is preferable in view of durability, coatability and adhesion. In the case of this combination, the content of N-hydroxyethyl(meth)acrylamide is preferably 40% by weight or more based on the total amount of N-hydroxyethyl(meth)acrylamide and N-acryloylmorpholine, in terms of achieving good adhesion. The content of N-hydroxyethyl(meth)acrylamide is more preferably from 40 to 90% by weight, still more preferably from 60 to 90% by weight.

A monomer for use as the curable component, which may be combined with the hydroxyl group-containing N-substituted amide monomer, besides the above, includes other (meth)acryloyl group-containing compounds such as a variety of epoxy (meth)acrylates, urethane (meth)acrylates, and polyester (meth)acrylates, and a variety of (meth)acrylate monomers. In particular, epoxy (meth)acrylates, specifically monofunctional (meth)acrylates having an aromatic ring and a hydroxy group are preferably used.

A variety of monofunctional (meth)acrylates each having an aromatic ring and a hydroxy group may be used. The hydroxy group may be present as a substituent on the aromatic ring, but in the present invention, it is preferred that the hydroxy group is present on an organic group (bonded to a hydrocarbon group, specifically bonded to an alkylene group) linking the aromatic ring and (meth)acrylate.

The monofunctional (meth)acrylate having an aromatic ring and a hydroxy group may be a reaction product of a monofunctional epoxy compound having an aromatic ring with (meth)acrylic acid. Examples of the monofunctional epoxy compound having an aromatic ring include phenyl glycidyl ether, tert-butyl phenyl glycidyl ether, and phenyl polyethylene glycol glycidyl ether. Examples of the monofunctional (meth)acrylate having an aromatic ring and a hydroxy group include 2-hydroxy-3-phenoxypropyl (meth)acrylate, 2-hydroxy-3-tert-butylphenoxypropyl (meth)acrylate, and 2-hydroxy-3-phenyl polyethylene glycol propyl (meth)acrylate.

The (meth)acryloyl group-containing compound may also be a carboxyl group-containing monomer, which is also preferred in view of adhesion. Examples of the carboxyl group-containing monomer include (meth)acrylic acid, carboxyethyl (meth)acrylate, and carboxypentyl (meth)acrylate. In particular, acrylic acid is preferred.

Besides the above, other examples of the (meth)acryloyl group-containing compound include alkyl (meth)acrylate having 1 to 12 carbon atoms such as such as methyl (meth)acrylate, ethyl (meth)acrylate, n-butyl (meth)acrylate, 2-ethylhexyl (meth)acrylate, isooctyl (meth)acrylate, isononyl (meth)acrylate, and lauryl (meth)acrylate; alkoxyalkyl (meth)acrylate monomers such as methoxyethyl (meth)acrylate and ethoxyethyl (meth)acrylate; hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate, and (4-hydroxymethylcyclohexyl)methyl acrylate; acid anhydride group-containing monomers such as maleic anhydride and itaconic anhydride; caprolactone adducts of acrylic acid; sulfonate group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, and (meth)acryloyloxynaphthalenesulfonic acid; and phosphate group-containing monomers such as 2-hydroxyethylacryloyl phosphate. Examples of other monomers also include (meth)acrylamide; maleimide, N-cyclohexylmaleimide, N-phenylmaleimide; alkylaminoalkyl (meth)acrylate monomers such as aminoethyl (meth)acrylate, aminopropyl (meth)acrylate, N,N-dimethylaminoethyl (meth)acrylate, tert-butylaminoethyl (meth)acrylate, and 3-(3-pyrimidyl)propyl (meth)acrylate; and nitrogen-containing monomers including succinimide monomers such as N-(meth)acryloyloxymethylenesuccinimide, N-(meth)acryloyl-6-oxyhexamethylenesuccinimide, and N-(meth)acryloyl-8-oxyoctamethylenesuccinimide.

As stated above, the hydroxyl group-containing N-substituted amide monomer is used as a curable component in the active energy ray-curable adhesive. It is preferred that the above N-substituted amide monomer represented by formula (1) is used in combination with the hydroxyl group-containing N-substituted amide monomer. When a monofunctional (meth)acrylate having an aromatic ring and a hydroxyl group is used together as a curable component, the content of the hydroxyl group-containing N-substituted amide monomer is preferably 40% by weight or more, more preferably 50% by weight or more, even more preferably 60% by weight or more, still more preferably 70% by weight or more, yet more preferably 80% by weight or more.

The curable component to be used may be a bifunctional or polyfunctional curable component. The bifunctional or polyfunctional curable component is preferably bifunctional or polyfunctional (meth)acrylate, particularly preferably bifunctional or polyfunctional epoxy (meth)acrylate. Such bifunctional or polyfunctional epoxy (meth)acrylate may be obtained by a reaction between a polyfunctional epoxy compound and (meth)acrylic acid. Various polyfunctional epoxy compounds may be listed such as aromatic epoxy resins, alicyclic epoxy resins, and aliphatic epoxy resins.

Examples of aromatic epoxy resins include bisphenol epoxy resins such as bisphenol A diglycidyl ether, bisphenol F diglycidyl ether, and bisphenol S diglycidyl ether; novolac epoxy resins such as phenol novolac epoxy resins, cresol novolac epoxy resins, and hydroxybenzaldehyde phenol novolac epoxy resins; and polyfunctional epoxy resins such as glycidyl ether of tetrahydroxyphenylmethane, glycidyl ether of tetrahydroxybenzophenone, and epoxidized polyvinyl phenol.

Examples of alicyclic epoxy resins include hydrogenated products of the above aromatic epoxy resins, cyclohexane type epoxy resins, cyclohexyl methyl ester type epoxy resins, cyclohexyl methyl ether type epoxy resins, spiro type epoxy resins, and tricyclodecane type epoxy resins.

Examples of aliphatic epoxy resins include polyglycidyl ethers of aliphatic polyhydric alcohols or alkylene oxide adducts thereof. Examples thereof include diglycidyl ether of 1,4-butanediol, diglycidyl ether of 1,6-hexanediol, glycerol triglycidyl ether, triglycidyl ether of trimethylolpropane, diglycidyl ether of polyethylene glycol, diglycidyl ether of propylene glycol, and polyglycidyl ethers of polyether polyol produced by adding one or two or more alkylene oxides (such as ethylene oxide and propylene oxide) to an aliphatic polyhydric alcohol such as ethylene glycol, propylene glycol, and glycerin.

The epoxy resin generally has an epoxy equivalent of 30 to 3000 g/equivalent, preferably of 50 to 1500 g/equivalent.

The bifunctional or polyfunctional epoxy (meth)acrylate is preferably epoxy (meth)acrylate of an aliphatic epoxy resin, particularly preferably epoxy (meth)acrylate of a bifunctional aliphatic epoxy resin.

In addition to the curable component, the active energy ray-curable adhesive according to the present invention may further contain an appropriate additive, if necessary. The active energy ray-curable adhesive to be used may be an electron beam curing-type or ultraviolet-ray curable adhesive. When the adhesive to be used is of an electron beam curing-type, it is not always necessary to add a photopolymerization initiator to the adhesive. On the other hand, when the adhesive to be used is of an ultraviolet-ray curing-type, a photopolymerization initiator is used. The photopolymerization initiator is generally used in an amount of about 0.1 to about 10 parts by weight, preferably of 0.5 to 3 parts by weight, based on 100 parts by weight of the curable component.

Examples of the additive include sensitizers for increasing the electron beam-curing rate or sensitivity, such as carbonyl compounds, adhesion promoters such as silane coupling agents and ethylene oxide, additives for improving wettability with the transparent protective film, additives for improving mechanical strength or workability, such as acryloxy group-containing compounds or hydrocarbons (natural or synthetic resins), ultraviolet-absorbing agents, age resistors, dyes, processing aids, ion-trapping agents, antioxidants, tackifiers, fillers (other than metal compound fillers), plasticizers, leveling agents, antifoaming agents, and antistatic agents.

In the polarizing plate of the present invention, a polarizer and a transparent protective film are provided with an adhesive layer interposed therebetween, and an adhesion facilitating layer is also included between the transparent protective film and the adhesive layer. The adhesion facilitating layer is formed with a polymer resin composition that contains a polymer resin and an organosilane compound having at least one functional group selected from an acryloyl group, a methacryloyl group, a vinyl group, and a mercapto group.

As the polymer resin constitutes the adhesion facilitating layer, examples of the polymer resin that may be used include various reins having a polyester skeleton, a polyether skeleton, a polycarbonate skeleton, a polyurethane skeleton, a silicone resin skeleton, a polyamide skeleton, a polyimide skeleton, or a polyvinyl alcohol skeleton. One or more of these polymer resins may be used alone or in combination. In view of the adhesive strength-improving effect, polyester skeleton-containing resins are preferred. The polymer resin may be any of an aqueous type and a solvent type.

For example, the functional group-containing organosilane may be a silane coupling agent having the functional group. Examples of acryloyl group-containing organosilane compounds include 3-acryloxypropyltrimethoxysilane and 3-acryloxypropyltriethoxysilane. Examples of methacryloyl group-containing organosilane compounds include 3-methacryloxypropyltriethoxysilane, 3-methacryloxypropyltrimethoxysilane, 3-methacryloxypropylmethyldimethoxysilane, and 3-methacryloxypropylmethyldiethoxysilane. Examples of vinyl group-containing organosilane compounds include vinyltrimethoxysilane, allyltriethoxysilane, allyltrimethoxysilane, p-styryltrimethoxysilane, and p-styryltriethoxysilane. Examples of mercapto group-containing organosilane compounds include 3-mercaptopropylmethyldimethoxysilane, 3-mercaptopropyltrimethoxysilane, and 3-mercaptopropyltriethoxysilane.

The functional group-containing organosilane compound can increase the adhesive strength, when added to the polymer resin. In order to further increase the adhesive strength, 3 to 30 parts by weight of the functional group-containing organosilane compound should be added to 100 parts by weight (in terms of solid content) of the polymer resin. The amount of the functional group-containing organosilane compound is preferably from 5 to 25 parts by weight, more preferably from 7 to 15 parts by weight, based on 100 parts by weight (in terms of solid content) of the polymer resin.

Other additives may be added to form the adhesion facilitating layer. Specifically, a tackifier, an ultraviolet absorbing agent, an antioxidant, or a stabilizing agent such as a heat-resistant stabilizer may be used. A compound capable of serving as a crosslinking component such as oxazoline, boric acid, a methylol compound such as trimethylolmelamine, carbodiimide, or an isocyanate compound may also be added, and an organosilane compound free of the above functional group or an organosilane compound having functional group other than the above functional group (a silane coupling agent such as an epoxy group-containing silane coupling agent, an amino group-containing silane coupling agent, or an isocyanate group-containing silane coupling agent) may also be blended. When used alone, the additive (or the crosslinking component) other than the functional group-containing organosilane compound cannot sufficiently improve the adhesive strength. However, the use of the additive in combination with the functional group-containing organosilane compound is not prohibited and can further improve the adhesion. When the additive is used in addition to the functional group-containing organosilane compound, the amount of the additive is preferably 50 parts by weight or less, more preferably from 1 to 40 parts by weight, even more preferably from 5 to 30 parts by weight, based on 100 parts by weight of the polymer resin.

In general, the adhesion facilitating layer is previously formed on the transparent protective film, and then the adhesion facilitating layer side of the transparent protective film is laminated to the polarizer with the adhesive layer. The adhesion facilitating layer may be formed by a process including the steps of preparing the polymer resin composition (an adhesion facilitating layer-forming material) containing the polymer resin and the functional group-containing organosilane compound, applying the layer-forming material onto the transparent protective film by a known technique, and drying the material by a known technique. The adhesion facilitating layer-forming material is generally prepared in the form of a solution diluted to an appropriate concentration in view of the post-drying thickness and smoothness of the coating process. After drying, the thickness of the adhesion facilitating layer is preferably from 0.01 to 5 μm, more preferably from 0.02 to 2 μm, even more preferably from 0.05 to 1 μm. Two or more adhesion facilitating layers may be formed. In this case, the total thickness of the adhesion facilitating layers should preferably fall within the above range. The transparent protective film may be stretched before or after the adhesion facilitating layer is formed on the transparent protective film by coating.

The polarizer may be made of a polyvinyl alcohol resin. The polarizer to be used may be produced by dyeing a polyvinyl alcohol resin film with a dichroic material (typically iodine or a dichroic dye) and uniaxially stretching the film. The polyvinyl alcohol resin constituting the polyvinyl alcohol resin film preferably has a degree of polymerization of 100 to 5000, more preferably of 1400 to 4000. If its polymerization degree is too low, it can tend to be broken in the process of stretching at a certain ratio. If its degree of polymerization is too high, unusual tension can be required for the stretching process, and thus mechanical stretching of it can be impossible.

The polyvinyl alcohol resin film for forming the polarizer may be formed by any appropriate method (such as an extrusion method, a casting method or a flow casting method of casting a solution obtained by dissolving a resin in water or an organic solvent to form a film). The thickness of the polarizer is generally about 5 to about 80 μm, while it may be determined as necessary depending on the purpose or application of the LCD for which the polarizing plate is used.

Any appropriate method may be used to produce the polarizer, depending on the purpose, the materials to be used, and the conditions. For example, a method that may be used includes subjecting the polyvinyl alcohol resin film to a series of manufacturing steps generally including swelling, dyeing, crosslinking, stretching, washing with water, and drying. Except for the drying step, each step may be performed while the polyvinyl alcohol resin film is immersed in a bath containing a solution necessary for each step. Concerning the steps of swelling, dyeing, crosslinking, stretching, washing with water, and drying, the order of the steps, the number of times of each step, or the presence or absence of each step may be appropriately determined depending on the purpose, the materials to be used and the conditions. For example, some steps may be simultaneously performed in a single process, and swelling, dyeing and crosslinking may be performed at the same time. For example, crosslinking before or after stretching is preferably employed. For example, washing with water may be performed after all of the other steps or only after a certain step.

The swelling step is typically performed by immersing the polyvinyl alcohol resin film in a treatment bath containing water. By this treatment, the surface of the polyvinyl alcohol resin film is cleaned of dirt and an anti-blocking agent, and the polyvinyl alcohol resin film is allowed to swell so that unevenness such as uneven dyeing can be prevented. Glycerin, potassium iodide and so on may be added, as appropriate, to the swelling bath. The temperature of the swelling bath is generally from about 20 to about 60° C., and the time of immersion in the swelling bath is generally from about 0.1 to about 10 minutes.

The dyeing step is typically performed by immersing the polyvinyl alcohol resin film in a treatment bath containing a dichroic material such as iodine. Water is generally used as a solvent for the dyeing bath solution, to which a proper amount of an organic solvent compatible with water may be added. The dichroic material is generally used in an amount of 0.1 to 1 part by weight, based on 100 parts by weight of the solvent. When iodine is used as the dichroic material, the dyeing bath solution preferably contain an aid such as an iodide, so that the dyeing efficiency can be improved. The aid is preferably used in an amount of 0.02 to 20 parts by weight, more preferably of 2 to 10 parts by weight, based on 100 parts by weight of the solvent. Examples of the iodide include potassium iodide, lithium iodide, sodium iodide, zinc iodide, aluminum iodide, lead iodide, copper iodide, barium iodide, calcium iodide, tin iodide, and titanium iodide. The temperature of the dyeing bath is generally from about 20 to about 70° C., and the time of immersion in the dyeing bath is generally from about 1 to about 20 minutes.

The crosslinking step is typically performed by immersing the dyed polyvinyl alcohol resin film in a treatment bath containing a crosslinking agent. Any appropriate crosslinking agent may be used. Examples of the crosslinking agent include boron compounds such as boric acid and borax, glyoxal, and glutaraldehyde. One or more of these crosslinking agents may be used alone or in combination. Water is generally used as a solvent for the crosslinking bath solution, to which a proper amount of an organic solvent compatible with water may be added. The crosslinking agent is generally used in an amount of 1 to 10 parts by weight, based on 100 parts by weight of the solvent. If the content of the crosslinking agent is less than 1 part by weight, the resulting optical properties can be insufficient. If the content of the crosslinking agent is more than 10 parts by weight, large stress can be applied to the film during stretching so that the resulting polarizing plate could be shrunk. The crosslinking bath solution preferably contains an aid such as an iodide, so that uniform in-plane properties can be easily obtained. The concentration of the aid is preferably from 0.05 to 15% by weight, more preferably from 0.5 to 8% by weight. Examples of the iodide may be the same as in the case of the dyeing step. The temperature of the crosslinking bath is generally from about 20 to about 70° C., preferably from 40 to 60° C. The time of immersion in the crosslinking bath is generally from about 1 second to about 15 minutes, preferably from 5 seconds to 10 minutes.

As described above, the stretching step may be performed at any stage. Specifically, the stretching step may be performed before or after the dyeing step, may be performed simultaneously with the swelling step, the dyeing step, and the crosslinking step, or may be performed after the crosslinking step. The polyvinyl alcohol resin film is generally stretched to a total stretch ratio of 5 times or more, preferably of 5 to 7 times, more preferably of 5 to 6.5 times. If the total stretch ratio is less than 5 times, it can be difficult to produce a polarizing plate with a high degree of polarization. If the total stretch ratio is more than 7 times, the polyvinyl alcohol resin film can tend to be broken. Any appropriate specific stretching method may be used. For example, when a wet stretching method is used, the polyvinyl alcohol resin film may be stretched to a specific stretch ratio in a treatment bath. The stretching bath solution to be used is preferably produced by adding various metal salts, iodine, boric acid, or a zinc compound to a solvent such as water or an organic solvent such as ethanol.

The step of washing with water is typically performed by immersing the polyvinyl alcohol resin film on which the above-described various treatments are carried out in a treatment bath. Unnecessary residues can be washed away from the polyvinyl alcohol resin film by the step of washing with water. The water-washing bath may be of pure water or an aqueous solution of an iodide such as potassium iodide and sodium iodide. The aqueous iodide solution preferably has a concentration of 0.1 to 10% by weight. An aid such as zinc sulfate and zinc chloride may be added to the aqueous iodide solution. The temperature of the water-washing bath is preferably from 10 to 60° C., more preferably from 30 to 40° C. The immersion time may be from 1 second to 1 minute. The step of washing with water may be performed only once or twice or more, if necessary. When the step of washing with water is performed twice or more, the type and concentration of the additive contained in the water-washing bath for each treatment may be controlled as appropriate. For example, the step of washing with water may include immersing the polyvinyl alcohol resin film in an aqueous potassium iodide solution (0.1 to 10% by weight, 10 to 60° C.) for 1 second to 1 minute after any of the above treatments and rinsing the film with pure water. In the step of washing with water, an organic solvent compatible with water (such as ethanol) may be added as appropriate in order to modify the surface of the polarizer or increase the efficiency of drying of the polarizer.

Any appropriate methods such as natural drying, blow drying, and drying by heating may be used in the drying step. In the case of drying by heating, for example, the drying temperature is generally from about 20 to about 80° C., and the drying time is generally from about 1 to about 10 minutes. The polarizer may be obtained as described above.

The polarizer for use in the present invention preferably has a moisture content of 20% by weight or less, more preferably of 0 to 15% by weight, still more preferably of 1 to 15% by weight. If the moisture content is more than 20% by weight, the size of the resulting polarizing plate can significantly change, and there is a possibility of causing a problem in which the change in size can be significant at high temperature or at high temperature and high humidity.

The moisture content of the polarizer for use in the present invention may be adjusted by any appropriate method. For example, the moisture content may be adjusted by controlling the conditions of the drying step in the process of manufacturing the polarizer.

The moisture content of the polarizer may be measured by the method described below. A sample (100×100 mm in size) is cut from the polarizer, and the initial weight of the sample is measured. The sample is then dried at 120° C. for 2 hours and measured for dry weight. The moisture content is determined according to the following formula: moisture content (% by weight)={(the initial weight)−(the dry weight)/(the initial weight)}×100. The measurement of each weight is performed three times, and the average value is used.

A thermoplastic resin with a high level of transparency, mechanical strength, thermal stability, moisture blocking properties, isotropy, and the like may be used as a material for forming the transparent protective film. Examples of such a thermoplastic resin include cellulose resins such as triacetylcellulose, polyester resins, polyethersulfone resins, polysulfone resins, polycarbonate resins, polyamide resins, polyimide resins, polyolefin resins, (meth)acrylic resins, cyclic olefin polymer resins (norbornene resins), polyarylate resins, polystyrene resins, polyvinyl alcohol resins, and any mixture thereof. The transparent protective film is generally laminated to one side of the polarizer with the adhesive layer, but thermosetting resins or ultraviolet curing resins such as (meth)acrylic, urethane, acrylic urethane, epoxy, or silicone resins may be used to other side of the polarizer for the transparent protective film. The transparent protective film may also contain at least one type of any appropriate additive. Examples of the additive include an ultraviolet absorbing agent, an antioxidant, a lubricant, a plasticizer, a release agent, an anti-discoloration agent, a flame retardant, a nucleating agent, an antistatic agent, a pigment, and a colorant. The content of the thermoplastic resin in the transparent protective film is preferably from 50 to 100% by weight, more preferably from 50 to 99% by weight, still more preferably from 60 to 98% by weight, particularly preferably from 70 to 97% by weight. If the content of the thermoplastic resin in the transparent protective film is 50% by weight or less, high transparency and other properties inherent in the thermoplastic resin can fail to be sufficiently exhibited.

Moreover, as is described in JP-A No. 2001-343529 (WO 01/37007), polymer films, for example, resin compositions including (A) thermoplastic resins having substituted and/or non-substituted imido group in sidechain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used. Since the films are less in retardation and less in photoelastic coefficient, faults such as unevenness due to a strain in a polarizing plate can be removed and besides, since they are less in moisture permeability, they are excellent in durability under humidified environment.

Thickness of the transparent protective film can be properly determined and generally in the range of from about 1 to about 500 μm from the viewpoint of a strength, workability such as handlability, requirement for a thin film and the like. Especially, the thickness is preferably in the range of from 1 to 300 μm and more preferably in the range of from 5 to 200 μm. Therefore, it is particularly preferred that the transparent protective film has a thickness of 5 to 150 μm.

Note that in a case where the transparent protective films are provided on both sides of a polarizer, the protective films made from the same polymer may be used on both sides thereof or alternatively, the protective films made from polymer materials different from each other may also be used on respective both sides thereof.

At least one selected from a cellulose resin, a polycarbonate resin, a cyclic polyolefin resin, and a (meth)acrylic resin is preferably used for the transparent protective film according to the present invention. The electron beam-curable adhesive for use in the polarizing plate according to the present invention exhibits good adhesion to various types of transparent protective films. In particular, the electron beam-curable adhesive for use in the polarizing plate according to the present invention exhibits good adhesion to acrylic resins, to which it has been difficult to provide satisfactory adhesion by conventional techniques.

The cellulose resin is an ester of cellulose and a fatty acid. Examples of such a cellulose ester resin include triacetyl cellulose, diacetyl cellulose, tripropionyl cellulose, dipropionyl cellulose, and the like. In particular, triacetyl cellulose is preferred. Much commercially available triacetyl celluloses are placing on sale and are advantageous in view of easy availability and cost. Examples of commercially available products of triacetyl cellulose include UV-50, UV-80, SH-80, TD-80U, TD-TAC, and UZ-TAC (trade names) manufactured by Fujifilm Corporation, and KC series manufactured by Konica Minolta. In general, these triacetyl cellulose products have a thickness direction retardation (Rth) of about 60 nm or less, while having an in-plane retardation (Re) of almost zero.

Cellulose resin films with relatively small thickness direction retardation may be obtained by processing any of the above cellulose resins. Examples of the processing method include a method that includes laminating a general cellulose-based film to a base film such as a polyethylene terephthalate, polypropylene, or stainless steel film, coated with a solvent such as cyclopentanone or methyl ethyl ketone, drying the laminate by heating (for example, at 80 to 150° C. for 3 to 10 minutes) and then separating the base film; and a method that includes coating a general cellulose resin film with a solution of a norbornene resin, a (meth)acrylic resin or the like in a solvent such as cyclopentanone or methyl ethyl ketone, drying the coated film by heating (for example, at 80 to 150° C. for 3 to 10 minutes), and then separating the coating.

The cellulose resin film with a relatively small thickness direction retardation to be used may be a fatty acid cellulose resin film with a controlled degree of fat substitution. While triacetyl cellulose for general use has a degree of acetic acid substitution of about 2.8, preferably, the degree of acetic acid substitution is controlled to 1.8 to 2.7, so that the Rth can be reduced. The Rth may also be controlled to be low by adding a plasticizer such as dibutyl phthalate, p-toluenesulfonanilide, and acetyl triethyl citrate, to the fatty acid-substituted cellulose resin. The plasticizer is preferably added in amount of 40 parts by weight or less, more preferably of 1 to 20 parts by weight, still more preferably of 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A Nos. 01-240517, 03-14882, and 03-122137. Specific examples thereof include ring-opened (co)polymers of cyclic olefins, addition polymers of cyclic olefins, copolymers (typically random copolymers) of cyclic olefins and α-olefins such as ethylene and propylene, graft polymers produced by modification thereof with unsaturated carboxylic acids or derivatives thereof, and hydrides thereof. Examples of the cyclic olefin include norbornene monomers.

Various commercially available cyclic polyolefin resins are placing on sale. Examples thereof include Zeonex (trade name) and Zeonor (trade name) series manufactured by Zeon Corporation, Arton (trade name) series manufactured by JSR Corporation, Topas (trade name) series manufactured by Ticona, and Apel (trade name) series manufactured by Mitsui Chemicals, Inc.

The (meth)acrylic resin preferably has a glass transition temperature (Tg) of 115° C. or more, more preferably of 120° C. or more, still more preferably of 125° C. or more, particularly preferably of 130° C. or more. If the Tg is 115° C. or more, the resulting polarizing plate can have good durability. The upper limit to the Tg of the (meth)acrylic resin is preferably, but not limited to, 170° C. or less, in view of formability and the like. The (meth)acrylic resin can form a film with an in-plane retardation (Re) of almost zero and a thickness direction retardation (Rth) of almost zero.

Any appropriate (meth)acrylic resin may be used as long as the advantages of the present invention are not reduced. Examples of such a (meth)acrylic resin include poly(meth)acrylate such as poly(methyl methacrylate), methyl methacrylate-(meth)acrylic acid copolymers, methyl methacrylate-(meth)acrylate copolymers, methyl methacrylate-acrylate-(meth)acrylic acid copolymers, methyl (meth)acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly($C_{1-6}$ alkyl (meth)acrylate) such as poly(methyl (meth)acrylate) is preferred, and a methyl methacrylate-based resin mainly composed of a methyl methacrylate unit (50 to 100% by weight, preferably 70 to 100% by weight) is more preferred.

Examples of the (meth)acrylic resin include Acrypet VH and Acrypet VRL20A each manufactured by Mitsubishi Rayon Co., Ltd., (meth)acrylic resins having a ring structure in their molecule as disclosed in JP-A No. 2004-70296, and high-Tg (meth)acrylic resins produced by intramolecular crosslinking or intramolecular cyclization reaction.

Lactone ring structure-containing (meth)acrylic resins may also be used, because they have high heat resistance and high transparency and also have high mechanical strength after biaxially stretched.

Examples of the lactone ring structure-containing (meth)acrylic reins include the lactone ring structure-containing (meth)acrylic reins disclosed in JP-A Nos. 2000-230016, 2001-151814, 2002-120326, 2002-254544, and 2005-146084.

The lactone ring structure-containing (meth)acrylic reins preferably have a ring structure represented by Formula (I):

[Formula 1]

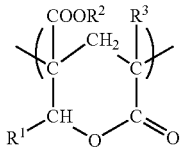

wherein $R^1$, $R^2$ and $R^3$ each independently represent a hydrogen atom or an organic residue of 1 to 20 carbon atoms. The organic residue may contain an oxygen atom(s).

The content of the lactone ring structure represented by Formula (I) in the lactone ring structure-containing (meth)acrylic resin is preferably from 5 to 90% by weight, more preferably from 10 to 70% by weight, still more preferably from 10 to 60% by weight, particularly preferably from 10 to 50% by weight. If the content of the lactone ring structure represented by Formula (I) in the lactone ring structure-containing (meth)acrylic resin is less than 5% by weight, its heat resistance, solvent resistance or surface hardness can be insufficient. If the content of the lactone ring structure represented by Formula (I) in the lactone ring structure-containing (meth)acrylic resin is more than 90% by weight, its formability or workability can be poor.

The lactone ring structure-containing (meth)acrylic resin preferably has a mass average molecular weight (also referred to as weight average molecular weight) of 1,000 to 2,000,000, more preferably of 5,000 to 1,000,000, still more preferably of 10,000 to 500,000, particularly preferably of 50,000 to 500,000. A mass average molecular weight outside the above range is not preferred in view of formability or workability.

The lactone ring structure-containing (meth)acrylic resin preferably has a Tg of 115° C. or more, more preferably of 120° C. or more, still more preferably of 125° C. or more, particularly preferably of 130° C. or more. For example, the resin with a Tg of 115° C. or more can produce good durability, when it is incorporated in the form of a transparent protective film in a polarizing plate. The upper limit to the Tg of the lactone ring structure-containing (meth)acrylic resin is preferably, but not limited to, 170° C. or less in view of formability and the like.

The total light transmittance of the lactone ring structure-containing (meth)acrylic resin, which may be measured according to ASTM-D-1003 with respect to injection molded products, is preferably as high as possible, and specifically, it is preferably 85% or more, more preferably 88% or more, still more preferably 90% or more. The total light transmittance is an index of transparency, and a total light transmittance of less than 85% can result in reduced transparency.

The transparent protective film to be used generally has an in-plane retardation of less than 40 nm and a thickness direction retardation of less than 80 nm. The in-plane retardation Re is expressed by the formula Re=(nx−ny)×d, the thickness direction retardation Rth is expressed by the formula Rth=(nx−nz)×d, and the Nz coefficient is represented by the formula Nz=(nx−nz)/(nx−ny), where nx, ny and nz are the refractive indices of the film in the directions of its slow axis, fast axis and thickness, respectively, d is the thickness (nm) of the film, and the direction of the slow axis is a direction in which the in-plane refractive index of the film is maximum. Moreover, it is preferable that the transparent protective film may have as little coloring as possible. A protective film having a thickness direction retardation of from −90 nm to +75 nm may be preferably used. Thus, coloring (optical coloring) of polarizing plate resulting from a protective film may mostly be cancelled using a protective film having a thickness direction retardation (Rth) of from −90 nm to +75 nm. The thickness direction retardation (Rth) is preferably from −80 nm to +60 nm, and especially preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled in the range of 40 to 200 nm, and the thickness direction retardation is generally controlled in the range of 80 to 300 nm. The retardation plate for use as the transparent protective film also has the function of the transparent protective film and thus can contribute to a reduction in thickness.

Examples of the retardation plate include a birefringent film produced by uniaxially or biaxially stretching a polymer material, an oriented liquid crystal polymer film, and an oriented liquid crystal polymer layer supported on a film. The thickness of the retardation plate is generally, but not limited to, from about 20 to about 150 μm.

Examples of the polymer material include polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resins, cyclic polyolefin resins (norbornene reins), and various types of binary or ternary copolymers thereof, graft copolymers thereof, and any blend thereof. Any of these polymer materials may be formed into an oriented product (a stretched film) by stretching or the like.

Examples of the liquid crystal polymer include various main-chain or side-chain types having a liquid crystal molecular orientation property-imparting conjugated linear atomic group (mesogen) introduced in a main or side chain of a polymer. Examples of the main chain type liquid crystal polymer include polymers having a mesogen group bonded thereto via a flexibility-imparting spacer moiety, such as nematically ordered polyester liquid-crystalline polymers, discotic polymers, and cholesteric polymers. For example, the side-chain type liquid crystal polymer may be a polymer comprising: a main chain skeleton of polysiloxane, polyacrylate, polymethacrylate, or polymalonate; and a side chain having a mesogen moiety that comprises a nematic orientation-imparting para-substituted cyclic compound unit and is bonded thereto via a spacer moiety comprising a conjugated atomic group. For example, any of these liquid crystal polymers may be applied by a process that includes spreading a solution of the liquid crystalline polymer on an alignment surface such as a rubbed surface of a thin film of polyimide, polyvinyl alcohol or the like, formed on the glass plate, and an obliquely vapor-deposited silicon oxide surface, and heat-treating it.

The retardation plate may have any appropriate retardation depending on the intended use such as compensation for coloration, viewing angle, or the like due to the birefringence of various wave plates or liquid crystal layers. Two or more types of retardation plates may also be laminated to provide controlled optical properties, including retardation.

A retardation plate satisfying the relation: nx=ny>nz, nx>ny>nz, nx>ny=nz, nx>nz>ny, n=nx>ny, nz>nx>ny, or nz>nx=ny may be selected and used depending on various applications. The relation ny=nz includes not only the case where ny is completely equal to nz but also the case where ny is substantially equal to nz.

For example, the retardation plate satisfying the relation nx>ny>nz to be used preferably has an in-plane retardation of 40 to 100 nm, a thickness retardation of 100 to 320 nm, and an Nz coefficient of 1.8 to 4.5. For example, the retardation plate satisfying the relation nx>ny=nz (positive A plate) to be used preferably has an in-plane retardation of 100 to 200 nm. For example, the retardation plate satisfying the relation nz=nx>ny (negative A plate) to be used preferably has an in-plane retardation of 100 to 200 nm. For example, the retardation plate satisfying the relation nx>nz>ny to be used preferably has a in-plane retardation of 150 to 300 nm and an Nz coefficient of more than 0 and not more than 0.7. As described above, for example, the retardation plate satisfying the relation nx=ny>nz, nz>nx>ny or nz>nx=ny may also be used.

The transparent protective film may be appropriately selected depending on the liquid crystal display to be produced therewith. In the case of VA (Vertical Alignment, including MVA and PVA), it is preferred that the transparent protective film on at least one side of the polarizing plate (on the cell side) has a retardation. Specifically, it preferably has a retardation Re in the range of 0 to 240 nm and a retardation Rth in the range of 0 to 500 nm. In terms of three-dimensional refractive index, the case of nx>ny=nz, nx>ny>nz, nx>nz>ny, or nx=ny>nz (uniaxial, biaxial, Z conversion, negative C-plate) is preferred. When polarizing plates are used on upper and lower sides of a liquid crystal cell, the transparent protective films may have a retardation on upper and lower sides of the liquid crystal cell, or one of the upper and lower transparent protective films may has a retardation.

For example, in the case of IPS (In-Plane Switching, including FFS), the transparent protective film for use in one of the polarizing plates may have or may not have a retardation. For example, a transparent protective film with no retardation is preferably provided on both upper and lower sides of a liquid crystal cell (cell sides), or otherwise a transparent protective film with a retardation is preferably provided on both or one of the upper and lower sides of a liquid crystal cell (for example, Z conversion on the upper side with no retardation on the lower side or an A-plate provided on the upper side with a positive C-plate provided on the lower side). When it has a retardation, it preferably has a retardation Re in the range of −500 to 500 nm and a retardation Rth in the range of −500 to 500 nm. In terms of three-dimensional refractive index, $nx>ny=nz$, $nx>nz>ny$, $nz>nx=ny$, or $nz>nx>ny$ (uniaxial, Z conversion, positive C-plate, positive A-plate) is preferred.

The film with retardation may be separately prepared and laminated to a transparent protective film with no retardation so that the function described above can be provided.

A hard coat layer may be prepared, or antireflection processing, processing aiming at sticking prevention, diffusion or anti glare may be performed onto the face, which is not prepared with an adhesion facilitating layer, of the transparent protective film on which the polarizing film not been adhered.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 70 weight parts to the transparent resin 100 weight parts that forms the fine concavo-convex structure on the surface, and preferably 5 to 50 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective film.

The polarizing plate of the present invention is manufactured by bonding the transparent protective film to the polarizer with the adhesive. The adhesion facilitating layer is placed between the transparent protective film and the adhesive layer formed with the adhesive. In general, the adhesion facilitating layer is formed on the transparent protective film and then bonding with the adhesive so as to face the polarizer.

In the manufacture method, the bonding process may include the steps of applying the adhesive to the adhesive layer receiving surface of the polarizer and/or the adhesion facilitating layer side of the transparent protective film, then laminating the polarizer to the adhesion facilitating layer on the transparent protective film with the polarizing plate adhesive interposed between the polarizer and the adhesion facilitating layer, and then irradiating an active energy ray (such as an electron beam or ultraviolet light) to the polarizer and the transparent protective film bonded with the polarizing plate adhesive interposed therebetween, so that an adhesive layer is formed.

Before the adhesive is applied, the polarizer, the transparent protective film, or the adhesion facilitating layer may be subjected to surface modification treatment. Specific examples of such treatment include corona treatment, plasma treatment and saponification treatment.

Any appropriate coating method for applying the adhesive may be chosen depending on the viscosity of the adhesive or the desired thickness. Examples of coating methods include reverse coating, gravure coating (direct, reverse or offset), bar reverse coating, roll coating, die coating, bar coating, and rod coating. A dipping method or any other coating method may also be suitably used for coating.

The polarizer is laminated to the transparent protective film with the adhesive coating interposed therebetween. The lamination of the polarizer and the transparent protective film may be performed using a roll laminator or the like.

After the polarizer and the transparent protective film are laminated, the adhesive is cured by the irradiation of an active energy ray (such as an electron beam or an ultraviolet ray). The active energy ray (such as an electron beam or an ultraviolet ray) may be applied in any appropriate direction. The active energy ray is preferably applied from the transparent protective film side. There is a possibility that the application of the active energy ray (such as an electron beam or an ultraviolet ray) from the polarizer side could lead to degradation of the polarizer.

The active energy ray-curable adhesive to be used is preferably an electron beam-curable adhesive. Any appropriate conditions under which the adhesive can be cured may be used for the irradiation of an electron beam. For example, an electron beam is preferably irradiated at an accelerating voltage of 5 kV to 300 kV, more preferably of 10 kV to 250 kV. If the accelerating voltage is less than 5 kV, the electron beam can fail to reach the adhesive so that the curing can be insufficient. If the accelerating voltage is more than 300 kV, the degree of penetration through the object can be too high so that the electron beam can be reflected to damage the transparent protective film or the polarizer. The irradiation dose is preferably from 5 to 100 kGy, more preferably from 10 to 75 kGy. If the irradiation dose is less than 5 kGy, the adhesive can be insufficiently cured. An irradiation dose of more than 100 kGy can damage the transparent protective film or the polarizer and cause a reduction in mechanical strength or yellow discoloration so that the desired optical properties cannot be achieved.

When an ultraviolet ray is irradiated for curing, a polymerization initiator may be added in an amount of 0.1 to 5 parts by weight based on 100 parts by weight of the curable component, preferably of 1 to 4 parts by weight, more preferably of 2 to 3 parts by weight. Any appropriate conditions under which the adhesive can be cured may be employed for the irradiation of an ultraviolet ray. The ultraviolet irradiation dose is preferably from 100 to 500 mJ/cm$^2$, more preferably from 200 to 400 mJ/cm$^2$.

In the polarizing plate obtained as described above according to the present invention, the adhesive layer has a thickness of 0.01 to 7 μm, preferably of 0.01 to 5 μm, more preferably of 0.01 to 2 μm, still more preferably of 0.01 to 1 μm. If the thickness is less than 0.01 μm, the adhesive can fail to produce a cohesive force by itself so that there is a possibility that adhesive strength fails to be established. If the thickness of the adhesive layer is more than 7 μm, the polarizing plate may fail to have sufficient durability.

The electron beam irradiation is generally performed in an inert gas. If necessary, a small amount of air or oxygen may be introduced under the conditions for the irradiation. Oxygen may be introduced as appropriate depending on the material of the transparent protective film. In such a case, the electron beam initially irradiated to the surface of the transparent protective film is intentionally inhibited by the oxygen so that the transparent protective film can be prevented from being damaged and that the electron beam can be efficiently irradiated only to the adhesive.

When the production method is performed on a continuous line, the line speed is preferably from 1 to 500 m/minute, more preferably from 5 to 300 m/minute, still more preferably from 10 to 100 m/minute, depending on the time of curing of the adhesive. A too low line speed can lead to poor productivity or significant damage to the transparent protective film so that it could be impossible to produce polarizing plates durable to an endurance test. A too high line speed can lead to insufficient curing of the adhesive so that there is a possibility that the desired adhesion can not be obtained.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective film etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective film directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

A description of the elliptically polarizing plate or circularly polarizing plate in which the retardation plate is laminated to the polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyarylates and polyamides; aligned films comprising liquid crystal materials, such as liquid crystal polymer; and films on which an alignment layer of a liquid crystal material is supported may be mentioned. A retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined alignment film etc. may be used. As inclined alignment film, for example, a film obtained using a method in which a heat shrinking film is adhered to a polymer film, and then the combined film is heated and stretched or shrunk under a condition of being influenced by a shrinking force, or a film that is aligned in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, a pressure-sensitive adhesive layer may also be prepared for adhesion with other members, such as a liquid crystal cell etc. As pressure-sensitive adhesive that forms pressure-sensitive layer is not especially limited, and, for example, acrylic type polymers; silicone type polymers; polyesters, polyurethanes, polyamides, polyethers; fluorine type and rubber type polymers may be suitably selected as a base polymer. Especially, a pressure-sensitive adhesive such as acrylics type pressure-sensitive adhesives may be preferably used, which is excellent in optical transparency, showing adhesion characteristics with moderate wettability, cohesiveness and adhesive property and has outstanding weather resistance, heat resistance, etc.

Moreover, a pressure-sensitive adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The pressure-sensitive adhesive layer may contain additives, for example, such as natural or synthetic resins, adhesive resins, glass fibers, glass beads, metal powder, fillers comprising other inorganic powder etc., pigments, colorants and antioxidants. Moreover, it may be a pressure-sensitive adhesive layer that contains fine particle and shows optical diffusion nature.

Proper method may be carried out to attach a pressure-sensitive adhesive layer to one side or both sides of the optical film. As an example, about 10 to about 40 weight % of the pressure-sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which a pressure-sensitive adhesive layer is once formed on a separator, as mentioned above, and is then transferred on a polarizing plate or an optical film may be mentioned.

A pressure-sensitive adhesive layer may also be prepared on one side or both sides of a polarizing plate or an optical film as a layer in which pressure-sensitive adhesives with different composition or different kind etc. are laminated together. Moreover, when pressure-sensitive adhesive layers are prepared on both sides, pressure-sensitive adhesive layers that have different compositions, different kinds or thickness, etc. may also be used on front side and backside of a polarizing plate or an optical film. Thickness of a pressure-sensitive adhesive layer may be suitably determined depending on a purpose of usage or adhesive strength, etc., and generally is 1 to 40 µm, preferably 1 to 300 µm, and more preferably 10 to 25 µm. If the thickness is less than 1 µm, its durability can be poor. If the thickness is more than 40 µm, separation or peeling is likely to occur due to foaming or the like so that the appearance can be degraded.

A temporary separator is attached to an exposed side of a pressure-sensitive adhesive layer to prevent contamination etc., until it is practically used. Thereby, it can be prevented that foreign matter contacts pressure-sensitive adhesive layer in usual handling. As a separator, without taking the above-mentioned thickness conditions into consideration, for example, suitable conventional sheet materials that is coated, if necessary, with release agents, such as silicone type, long chain allyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In order to increase the adhesion between the polarizing plate and the pressure-sensitive adhesive layer, an anchor layer may be placed between them.

An anchoring agent selected from polyurethane, polyester and a polymer having an amino group in its molecule may be preferably used as a material for forming the anchor layer. The polymer having an amino group in its molecule is particularly preferred. The amino group in the polymer molecule makes interaction such as a reaction or ionic interaction with the carboxyl group or the like in the pressure-sensitive adhesive so that good adhesion can be ensured.

Examples of the polymers having an amino group in its molecule include polymers of an amino group-containing monomer such as polyethyleneimine, polyallylamine, polyvinylamine, polyvinylpyridine, polyvinylpyrrolidine, and dimethylaminoethyl acrylate.

An antistatic agent may also be added to the anchor layer in order to impart antistatic properties. Examples of the antistatic agent that may be used to impart antistatic properties include ionic surfactants, electrically-conductive polymers such as polyaniline, polythiophene, polypyrrole, and polyquinoxaline, and metal oxides such as tin oxide, antimony oxide and indium oxide. Electrically-conductive polymers are preferably used in view of optical properties, appearance, antistatic effect, and stability of antistatic effect during heating or humidifying. In particular, water-dispersible or water-soluble electrically-conductive polymers such as polyaniline and polythiophene are preferably used. When water-soluble or water-dispersible electrically-conductive polymers are used as a material for forming the antistatic layer, organic solvent-induced deterioration of the optical film substrate can be prevented in the coating process.

In addition, in the present invention, ultraviolet absorbing property may be given to the above-mentioned each layer, such as a polarizer for a polarizing plate, a transparent protective film and an optical film etc. and a pressure-sensitive adhesive layer, using a method of adding UV absorbents, such as salicylic acid ester type compounds, benzophenol type compounds, benzotriazol type compounds, cyano acrylate type compounds, and nickel complex salt type compounds.

A polarizing plate or an optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessity, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing plate or optical film has been located at one side or both sides of the liquid crystal cell, and with which a backlight or a reflector is used for a lighting system may be manufactured. In this case, the polarizing plate or optical film by the present invention may be installed in one side or both sides of the liquid crystal cell. When installing the polarizing plate or optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent substrate in an order configuring an illuminant (organic electro luminescence illuminant). Here, an organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent substrate and is transmitted through a transparent electrode and an organic emitting layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Examples of the present invention are described below, but the embodiments of the present invention are not limited to these Examples.
(Polarizer)

A 75 μm-thick polyvinyl alcohol film with an average polarization degree of 2400 and a saponification degree of 99.9% by mole was immersed in warm water at 30° C. for 60 seconds so that it was allowed to swell. The film was then stretched to 3.5 times while it was dyed in a 0.3% by weight iodine solution (iodine:potassium iodide=0.5:8 in weight ratio) at 30° C. for 1 minute. The film was then stretched to a total stretch ratio of 6 times, while it is immersed in an aqueous 4% by weight boric acid solution at 65° C. for 0.5 minutes. After the stretching, the film was dried in an oven at 70° C. for 3 minutes to give a 26 μm-thick polarizer. The polarizer had a moisture content of 13.5% by weight.
(Transparent Protective Film)

Lactonized polymethyl methacrylate film (20% in a lactonization degree, 30 μm in thickness, 0 nm in Re, 0 nm in Rth (the film is represented by LMMA in Table 1)), norbornene resin film (Zeonor (trade name), 40 μm in thickness, manufactured by Zeon Corporation (the film is represented by Zeonor in Table 1)), polyester resin film (S100-38 (trade name), 38 μm in thickness, manufactured by Mitsubishi Plastics Inc. (the film is represented by S100-38 in Table 1)), or cellulose resin film (KC4UY (trade name), 40 μm in thickness, manufactured by Konica Minolta Opto, Inc. (the film is represented by KC4UY in Table 1)), was used as the transparent protective film.
(Retardation)

The retardation was measured at a wavelength of 590 nm with a retardation meter (KOBRA21-ADH (product name) manufactured by Oji Scientific Instruments) based on parallel Nicols rotation method. The in-plane retardation Re, the retardation Rth in the thickness direction and Nz were calculated from nx, ny and nz values and the thickness (d) of the film, wherein nx is the refractive index in the direction of the slow axis of the film, ny is the refractive index in the direction of the fast axis of the film, nz is the refractive index in the direction of the thickness of the film, and d (nm) is the thickness of the film, and the direction of the slow axis is defined such that the in-plane refractive index of the film is the maximum in the direction of the slow axis.

Example 1

Adhesive: Curable Component

N-hydroxyethylacrylamide was used as an adhesive.
(Formation of Adhesion Facilitating Layer)

An adhesion facilitating layer-forming material (with a solid content of 11% by weight) was prepared by mixing 100 parts by weight (in terms of solid content) of a polyester skeleton-containing polymer (Superflex SF210 manufactured by Dai-Ichi Kogyo Seiyaku Co., Ltd.) and 10 parts by weight of 3-acryloxypropyltrimethoxysilane (KBM5103 manufactured by Shin-Etsu Silicone Co., Ltd.). The layer-forming material was applied to one side of a transparent protective film (the lactonized polymethyl methacrylate film) with a bar coater so as to have a thickness of 0.3 μm, and dried at 150° C. so that an adhesion facilitating layer was formed on the transparent protective film.
(Preparation of Polarizing Plate)

The adhesive was applied to the adhesion facilitating layer formed on the transparent protective film with a micro gravure coater (gravure roll: #300, rotational speed: 140%/line speed) so that the transparent protective film was coated with the adhesive coating with a thickness of 5 μm. The adhesive-coated transparent protective film was then laminated to both sides of the polarizer with a roller machine. An electron beam was irradiated to the side of each of the laminated transparent protective films (both sides) so that a polarizing plate including the polarizer and the transparent protective films bonded on both sides of the polarizer was obtained. The line speed was 20 nm/minute, the accelerating voltage was 250 kV, and the irradiation dose was 20 kGy.

Examples 2 to 13 and Comparative Examples 1 to 19

Polarizing plates were obtained using the process of Example 1, except that the type of the transparent protective film, the type of the adhesive (curable component), the composition of the adhesive (when any other component was used together), the type of the polymer resin for forming the adhesion facilitating layer, the type of the additive, or the content of the additive was changed as shown in Table 1.

Example 14

Adhesive: Curable Component

The adhesive used was a mixture of 100 parts by weight of N-hydroxyethylacrylamide and 3 parts by weight of a photopolymerization initiator (Irgacure 127 (trade name) manufactured by Ciba Japan K.K.).
Preparation of Polarizing Plate An adhesion facilitating layer was formed on a transparent protective film (the lactonized polymethyl methacrylate film) in the same manner as Formation of Adhesion Facilitating Layer in Example 1. The adhesive prepared above was applied to the adhesion facilitating layer with a micro-gravure coater (gravure roll #300, rotational speed 140%/line speed) so that the transparent protective film was coated with the adhesive coating with a thickness of 5 μM. The adhesive-coated transparent protective film was then laminated to both sides of the polarizer with a roller machine. An ultraviolet ray was irradiated to the side of each the laminated transparent protective films (both sides) so that a polarizing plate including the polarizer and the transparent protective film bonded to both sides of the polarizer was obtained. The line speed was 20 m/minute, and the total exposure was 200 mJ/cm² for each side.

Comparative Examples 20 and 21

Polarizing plates were obtained using the process of Example 1, except that the polymer resin for forming the adhesion facilitating layer and the presence or absence of the additives were changed as shown in Table 1.
(Evaluation)

The polarizing plates obtained in Examples and Comparative Examples were evaluated as described below. The results are shown in Table 1.
<Adhesive Strength>
The resulting polarizing plate was cut into a sample piece 15 mm×150 mm in size. The sample was attached to a glass plate with a double-side adhesive tape (No. 500 manufactured by Nitto Denko Corporation). A starting portion was formed between the transparent protective film and the polarizer of the sample (polarizing plate). The starting portion was chucked by a variable-angle peel tester (manufactured by Asahi Seiko Co., Ltd.), and the peel strength (N/15 mm) was measured under the conditions of room temperature (23° C.), a peel angle of 90° and a peel speed of 3000 mm/minute. Table 1 shows the average of the resulting measurement data between 50 mm and 100 mm.

TABLE 1

| | | | Adhesive Layer | | | Adhesion Facilitating Layer | | | | |
| | | | Curable Components | | Polymer Resin | | Additives | | | |
| | | | | | | | Organosilane Compound | | Other | | |
| | | | HEAA | ACMO | SF210 | WLS202 | | | | | Adhesive |
| | Active Energy Ray | Transparent Protective Film | Parts by Weight | Parts by Weight | Parts by Weight | Parts by Weight | Type | Parts by Weight | Type | Parts by Weight | Strength (N/15 mm) |
|---|---|---|---|---|---|---|---|---|---|---|---|
| Example 1 | Electron Beam | LMMA | 100 | — | 100 | — | KBM5103 | 10 | — | — | 2.78 |
| Example 2 | Electron Beam | LMMA | 100 | — | 100 | — | KBM803 | 10 | — | — | 1.77 |
| Example 3 | Electron Beam | LMMA | 100 | — | 100 | — | KBM503 | 10 | — | — | 2.26 |
| Example 4 | Electron Beam | LMMA | 100 | — | 100 | — | KBM1003 | 10 | — | — | 2.43 |
| Example 5 | Electron Beam | LMMA | 80 | 20 | 100 | — | KBM5103 | 10 | — | — | 2.81 |
| Example 6 | Electron Beam | LMMA | 100 | — | 100 | — | KBM5103 | 5 | — | — | 1.87 |
| Example 7 | Electron Beam | LMMA | 100 | — | 100 | — | KBM5103 | 20 | — | — | 2.92 |
| Example 8 | Electron Beam | LMMA | 100 | — | 100 | — | KBM5103 | 10 | WS700 | 20 | 2.92 |
| Example 9 | Electron Beam | LMMA | 80 | 20 | 100 | — | KBM5103 | 10 | WS700 | 20 | 2.85 |
| Example 10 | Electron Beam | LMMA | 100 | — | — | 100 | KBM5103 | 10 | — | — | 1.34 |
| Example 11 | Electron Beam | Zeonor | 100 | — | 100 | — | KBM5103 | 10 | — | — | 1.81 |
| Example 12 | Electron Beam | S100-38 | 100 | — | 100 | — | KBM5103 | 10 | — | — | 2.13 |
| Example 13 | Electron Beam | KC4UY | 100 | — | 100 | — | KBM5103 | 10 | — | — | 2.45 |
| Example 14 | Ultraviolet Light | LMMA | 100 | — | 100 | — | KBM5103 | 10 | — | — | 2.66 |
| Comparative Example 1 | Electron Beam | LMMA | 100 | — | — | — | — | — | — | — | 0.24 |
| Comparative Example 2 | Electron Beam | LMMA | 100 | — | 100 | — | — | — | — | — | 0.31 |
| Comparative Example 3 | Electron Beam | LMMA | 100 | — | — | 100 | — | — | — | — | 0.49 |
| Comparative Example 4 | Electron Beam | LMMA | 100 | — | 100 | — | MS51 | 10 | — | — | 0.29 |
| Comparative Example 5 | Electron Beam | LMMA | 100 | — | 100 | — | — | — | N-MAM | 10 | 0.54 |
| Comparative Example 6 | Electron Beam | LMMA | 100 | — | 100 | — | — | — | M-3 | 10 | 0.47 |
| Comparative Example 7 | Electron Beam | LMMA | 100 | — | 100 | — | — | — | Boric Acid | 10 | 0.38 |
| Comparative Example 8 | Electron Beam | LMMA | 100 | — | 100 | — | — | — | WS700 | 20 | 0.42 |
| Comparative Example 9 | Electron Beam | LMMA | 100 | — | 100 | — | KBM403 | 10 | — | — | 0.90 |
| Comparative Example 10 | Electron Beam | LMMA | 100 | — | 100 | — | KBM585 | 10 | — | — | 0.76 |
| Comparative Example 11 | Electron Beam | LMMA | 100 | — | 100 | — | KBM603 | 10 | — | — | 0.23 |
| Comparative Example 12 | Electron Beam | LMMA | — | 100 | 100 | — | KBM5103 | 10 | — | — | 0.23 |
| Comparative Example 13 | Electron Beam | LMMA | 100 | — | 100 | — | KBM5103 | 1 | — | — | 0.92 |
| Comparative Example 14 | Electron Beam | Zeonor | 100 | — | — | — | — | — | — | — | 0.15 |
| Comparative Example 15 | Electron Beam | S100-38 | 100 | — | — | — | — | — | — | — | 0.31 |
| Comparative Example 16 | Electron Beam | KC4UY | 100 | — | — | — | — | — | — | — | 0.33 |

TABLE 1-continued

| | | | Adhesive Layer | | Adhesion Facilitating Layer | | | | | | |
|---|---|---|---|---|---|---|---|---|---|---|---|
| | | | Curable Components | | Polymer Resin | | Additives | | | | |
| | | | | | | | Organosilane | | | | |
| | | | HEAA | ACMO | SF210 | WLS202 | Compound | | Other | | Adhesive |
| | Active Energy Ray | Transparent Protective Film | Parts by Weight | Parts by Weight | Parts by Weight | Parts by Weight | Type | Parts by Weight | Type | Parts by Weight | Strength (N/15 mm) |
| Comparative Example 17 | Electron Beam | Zeonor | 100 | — | 100 | — | — | — | — | — | 0.38 |
| Comparative Example 18 | Electron Beam | S100-38 | 100 | — | 100 | — | — | — | — | — | 0.37 |
| Comparative Example 19 | Electron Beam | KC4UY | 100 | — | 100 | — | — | — | — | — | 0.45 |
| Comparative Example 20 | Ultraviolet light | LMMA | 100 | — | — | — | — | — | — | — | 0.28 |
| Comparative Example 21 | Ultraviolet Light | LMMA | 100 | — | 100 | — | — | — | — | — | 0.25 |

Table 1 uses the following abbreviations:
(Adhesives)
HEAA: N-hydroxyethylacrylamide
ACMO: N-acryloylmorpholine
(Adhesion Facilitating Layer-Forming Material: Polymer Resins)
SF210: polyester skeleton-containing polymer (Superflex SF210 manufactured by Dai-Ichi Kogyo Seiyaku Co., Ltd.)
WLS202: polyether skeleton-containing polymer (Hydran WLS202 manufactured by DIC Corporation)
(Adhesion Facilitating Layer-Forming Material: Aids)
KBM5103: 3-acryloxypropyltrimethoxysilane (KBM5103 manufactured by Shin-Etsu Silicone Co., Ltd.)
KBM803: 3-mercaptopropylmethyldimethoxysilane (KBM803 manufactured by Shin-Etsu Silicone Co., Ltd.)
KBM503: 3-methacryloxypropyltriethoxysilane (KBM503 manufactured by Shin-Etsu Silicone Co., Ltd.)
KBM1003: vinyltrimethoxysilane (KBM1003 manufactured by Shin-Etsu Silicone Co., Ltd.)
MS51: Methyl Silicate 51 (manufactured by Fuso Pharmaceutical Industries, Ltd.)
N-MAN: N-methylolacrylamide
M-3: trimethylolmelamine (M-3 manufactured by DIC Corporation)
WS700: oxazoline (WS700 manufactured by Nippon Shokubai Co., Ltd.)
KBM403: 3-glycidoxypropyltrimethoxysilane (KBM403 manufactured by Shin-Etsu Silicone Co., Ltd.)
KBE585: 3-ureidopropyltriethoxysilane (KBE585 manufactured by Shin-Etsu Silicone Co., Ltd.)
KBM603: N-2-(aminoethyl)-3-aminopropyltrimethoxysilane (KBM603 manufactured by Shin-Etsu Silicone Co., Ltd.).

What is claimed is:

1. A polarizing plate, comprising:
a polarizer;
a transparent protective film placed on at least one side of the polarizer; and
an adhesive layer and an adhesion facilitating layer interposed in this order from the polarizer side between the polarizer and the transparent protective film, wherein
the adhesive layer is formed by curing an active energy ray-curable adhesive that contains a hydroxyl group-containing N-substituted amide monomer as a curable component, and
the adhesion facilitating layer is formed with a polymer resin composition that contains 100 parts by weight of a polymer resin and 3 to 30 parts by weight of an organosilane compound having at least one functional group selected from the group consisting of an acryloyl group, a methacryloyl group, a vinyl group, and a mercapto group.

2. The polarizing plate according to claim 1, wherein the polymer resin constituting the adhesion facilitating layer has a polyester skeleton.

3. The polarizing plate according to claim 1, wherein the curable component contains an N-substituted amide monomer represented by the general formula (1): $CH_2$=$C(R^1)$—$CONR^2(R^3)$, wherein $R^1$ represents a hydrogen atom or a methyl group, $R^2$ represents a hydrogen atom or a straight or branched chain alkyl group having 1 to 4 carbon atoms and optionally having a hydroxyl group, a mercapto group, an amino group, or a quaternary ammonium group, and $R^3$ represents a hydrogen atom or a straight or branched chain alkyl group having 1 to 4 carbon atoms, provided that $R^2$ and $R^3$ are not simultaneously a hydrogen atom, or $R^2$ and $R^3$ are bonded to form a five-membered or six-membered ring optionally having an oxygen atom.

4. The polarizing plate according to claim 1, wherein the active energy ray-curable adhesive is an electron beam-curable adhesive.

5. The polarizing plate according to claim 1, wherein the transparent protective film is made of at least one resin selected from the group consisting of a cellulose resin, a polycarbonate resin, a cyclic olefin polymer resin and a (meth)acrylic resin.

6. A method for manufacturing a polarizing plate comprising a polarizer and a transparent protective film placed on at least one side of the polarizer with an adhesive layer and an adhesion facilitating layer interposed therebetween in this order from the polarizer side, comprising the steps of:
providing a transparent protective film on which an adhesion facilitating layer is formed, wherein the adhesion facilitating layer comprises a polymer resin composition that contains 100 parts by weight of a polymer resin and 3 to 30 parts by weight of an organosilane compound having at least one functional group selected from the group consisting of an acryloyl group, a methacryloyl group, a vinyl group, and a mercapto group;
laminating a polarizer to the transparent protective film with an active energy ray-curable adhesive containing a hydroxyl group-containing N-substituted amide monomer as a curable component such that the adhesion facilitating layer formed on the transparent protective film faces the polarizer; and then curing the adhesive by irradiation with an active energy ray to form an adhesive layer.

7. An optical film in which at least one layer of the polarizing plate according to claim 1 is laminated.

8. An image display, comprising the polarizing plate according to claim 1.

9. An image display, comprising the optical film according to claim 7.

* * * * *